Figure 5:
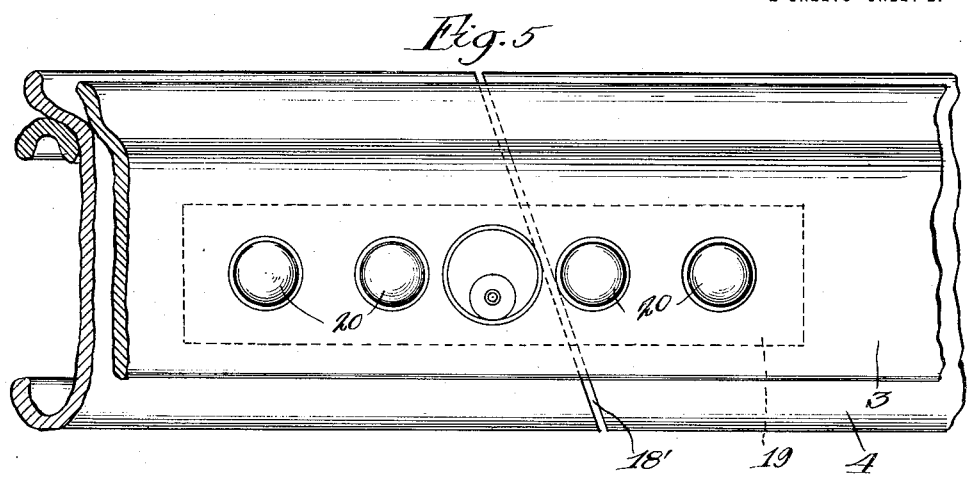

E. K. BAKER.
VEHICLE WHEEL.
APPLICATION FILED APR. 22, 1912.
1,155,395.
Patented Oct. 5, 1915.
2 SHEETS—SHEET 1.
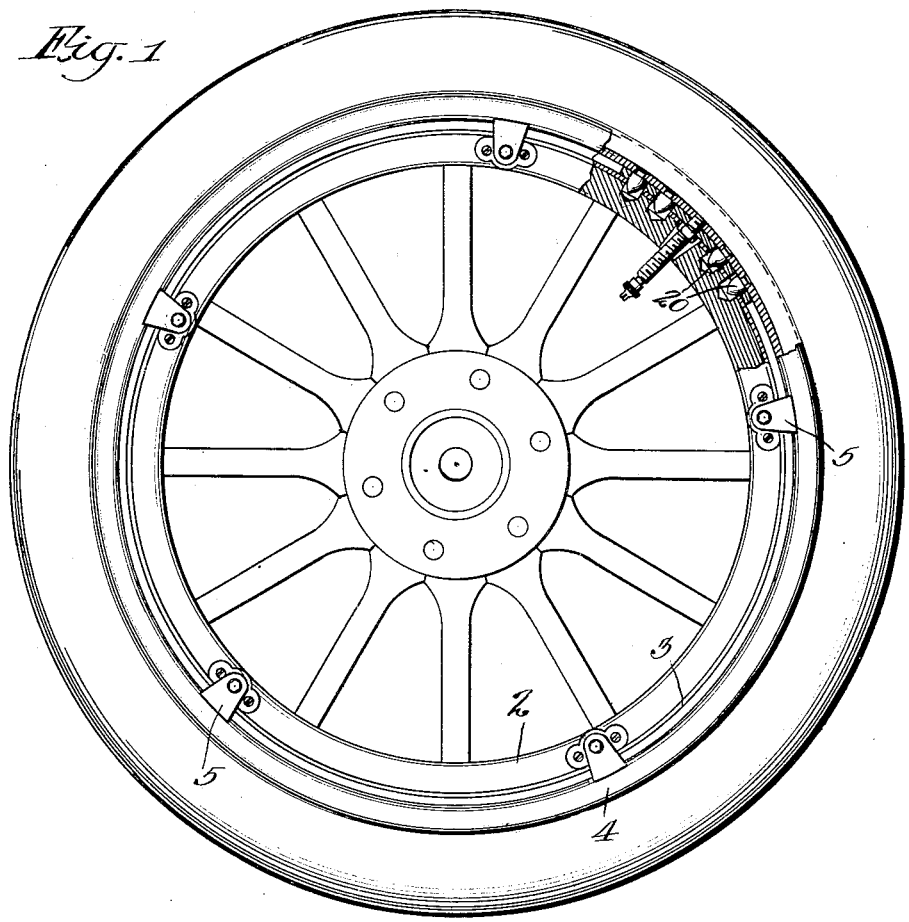
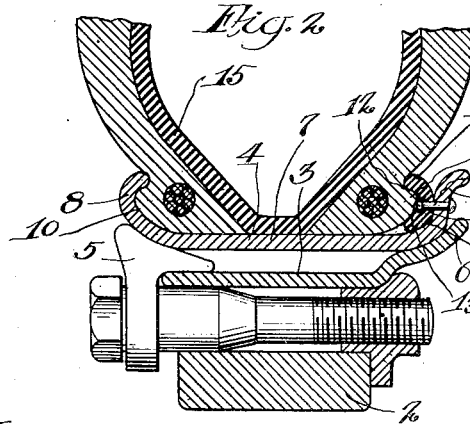
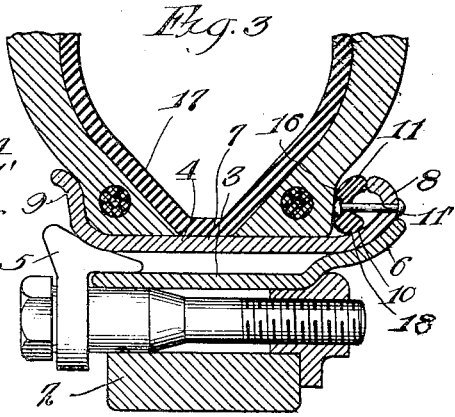

E. K. BAKER.
VEHICLE WHEEL.
APPLICATION FILED APR. 22, 1912.

1,155,395.

Patented Oct. 5, 1915.
2 SHEETS—SHEET 2.

Witnesses:
Earl E. Howe
Robert S. McCready

Inventor:
Erle K. Baker
by Charles Heller Hawley
Atty.

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

VEHICLE-WHEEL.

1,155,395.  Specification of Letters Patent.  Patented Oct. 5, 1915.

Application filed April 22, 1912. Serial No. 692,477.

*To all whom it may concern:*

Be it known that I, ERLE K. BAKER, a citizen of the United States, and a resident of Chicago, county of Cook, and State of Illinois, have invented certain new and useful Improvements in Vehicle-Wheels, of which the following is a specification.

My invention relates to improvements in vehicle wheels and has particular reference to improvements in metallic rims for receiving and holding resilient tires.

The object of my invention is to provide a metallic tire rim which shall be relatively light in weight, which shall consist of but few parts, and which shall be interchangeably adapted to carry a tire having a base made in one of two forms.

A further object of my invention is to provide a tire rim which shall be adapted for easy entrance into and removal from a tire of either clencher or Dunlop type having inexpansible base beads.

A further object of my invention is to provide a tire rim which shall have permanent flanges and which shall be adjustable to receive and hold pneumatic tires having inexpansible bases and of either the clencher or Dunlop type.

My invention consists in a tire rim having a tire holding flange of one form at one side of the rim and a tire holding flange of another form at the opposite side of the rim and having a separate or separable flange ring mounted on the rim between the flanges and movable from one of said flanges to the other and formed to present a tire receiving flange opposite to and adapted to cooperate with each of said rim flanges to retain a tire on the rim.

My invention further consists in a tire rim in the form of a split or open ring having integral tire flanges and provided with an adjustable ring between its flanges adapted to be moved from one side of the rim to the other to provide a tire space for the reception of the base of either a clencher tire or a straight side tire.

My invention further resides in a demountable tire rim split or open at one point in its circumference and having a hooked tire flange at one side and a straight tire flange at the other side, and an adjustable ring arranged between the flanges and adapted to coöperate with either of them to retain either a clencher or a straight side tire upon the rim.

My invention further consists in a split tire rim having a hooked flange at one side and a straight flange at the other and carrying a removable ring between the flanges formed to present a hooked flange upon one face and a straight flange upon the other face to coöperate with the similar flanges of the rim to hold tires having either clencher beads or straight sides.

My invention further consists in the various features of construction and in the combinations of parts by which the above and other objects are attained and all as hereinafter described and particularly pointed out in the claims.

Figure 6:
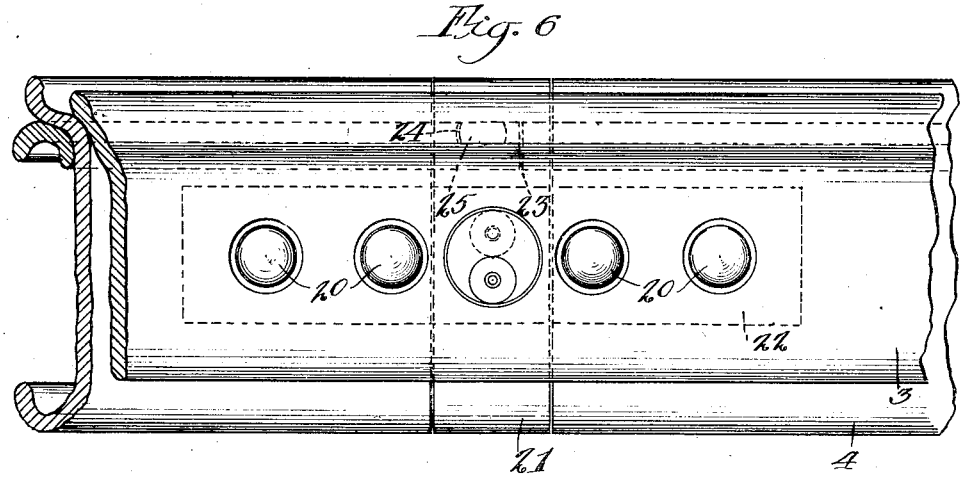
Figure 7:
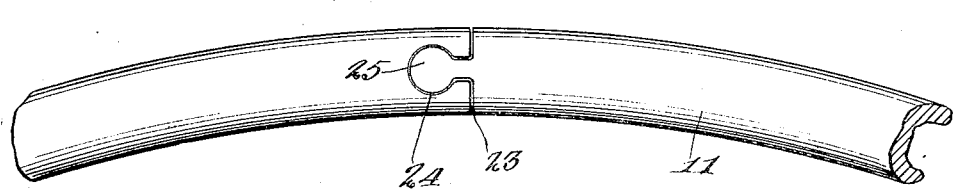

My invention will be more readily understood by reference to the accompanying drawings forming a part of this specification and in which:

Figure 1 is a side elevation of a vehicle wheel made in accordance with my invention; Fig. 2 is an enlarged detail section on the line 2—2 of Fig. 1, illustrating the position of the parts when arranged to receive a clencher tire; Fig. 3 is a similar section showing the parts arranged to receive a straight side or Dunlop tire; Fig. 4 is a section of the rim showing the separate ring in solid lines in position to receive a clencher tire and also showing it in dotted lines in position to receive a straight side tire; Fig. 5 is an enlarged plan view of the rim illustrating one method of connecting the ends of rim together; Fig. 6 is a similar view showing another method of connecting the rim ends together; and Fig. 7 is an enlarged view of a part of the separate flange showing one method of forming the flange.

My novel rim is particularly adapted for use with pneumatic tires. There are at present in general use two forms of tires, or, in other words, tires which have two forms of bases, one known as the clencher tire, which is provided with outwardly projecting base beads adapted to enter within inwardly turned flanges and be held thereby, and the other known as the Dunlop tire, the base of which is straight on its sides and which is provided within its base with metal cables or wires which effectually prevent the stretching of the base. These two forms of tires are in common use, and as the business of equipping automobiles is now carried on, the purchaser has usually the privilege of specifying which form of tire he desires to use. Therefore it is often impossible to decide upon the form of tire rim to be used upon any particular automobile until it is desired to ship it. For this reason, among others, it is desirable to have a rim so formed that the owner can use either type of tire which he desires without the necessity of deciding beforehand; and, furthermore, should it be desirable to place a tire of one type upon a wheel which has formerly been equipped with a tire of the opposite type it is desirable that this change be accomplished with the least expense and difficulty. I have, therefore, devised my novel form of rim, which is an interchangeable rim in the sense that a tire of either of two types can be placed upon the rim without the addition or subtraction of any parts. My rim as a whole is in itself a complete tire carrier adapted to receive either a clencher or a Dunlop tire and hold the tire placed thereon in readiness for use.

In the drawings I have shown a wooden wheel 2 of the usual construction provided on its periphery with a metallic rim or felly band 3. This felly band in combination with suitable rim fasteners supports and secures the tire rim 4 in position upon the wheel. In the drawings I have shown a number of wedging rim clamps 5 arranged upon one face of the wheel which coöperate with a flange 6 projecting from the opposite face of the wheel, and formed integrally with the felly band 3 and adapted to retain the tire rim in place upon the wheel. The tire rim 4 is of peculiar construction in that it consists of a middle cylindrical base portion 7 which is provided on one side or edge with an integral outwardly projecting and inwardly turned or hooked tire flange 8, and on its opposite side or edge with an integral outwardly extending and outwardly turned straight tire flange 9. The portions of the tire rim which connect the inner cylindrical portion thereof with the integral flanges are outwardly inclined and form wedging portions 10 which are adapted to seat upon the flange 6 at one side and upon the outer wedging surfaces of the clamps 5 at the other side. The integral flange 8 is of a form known as the clencher type and the integral flange 9 is that known as the Dunlop type, but it should be understood that my invention includes the idea of forming these flanges of other types, the features being preserved, however, that the flange at one side of the rim is of a different type from the flange at the opposite side of the rim. To complete my rim I provide a loose flange ring 11 which is mounted upon the rim between the flanges 8 and 9 and is of such a diameter that when it is placed adjacent to one of the flanges 8 or 9 it closely fits the rim at the base of the flange and becomes in a sense a part of the rim. This loose flange ring is of a cross section similar to the flanges 8 and 9, that is, it is of such a cross section that one of its side faces 12 presents a groove 13 adapted to receive the bead 14 of a clencher tire 15 and the ring is so placed upon the rim that when the ring is set against the straight flange 9 of the rim the groove 13 is presented opposite to the similar groove formed in the clencher flange, 8, and the two grooves thus presented are adapted to receive the clencher tire 15. The opposite face 16 of the flange ring is formed similar to the inner face of the straight rim flange 9 and the ring is adapted when placed against the hooked rim flange 8, as shown in Fig. 3 and in dotted lines in Fig. 4, to form within the rim a tire space adapted to receive the base of a Dunlop or straight side tire 17. The inner edge or base 18 of the ring 11 is formed to wedgingly engage the tire rim when placed in position against either of the rim flanges. As shown in the Figs. 2 and 3, I prefer to arrange the loose ring 11 at the rear side of tire regardless of the type of tire which is used. This can be accomplished by simply reversing the position of the rim upon the wheel when the type of tire used is changed. This results in the neatest appearance of the wheel, as a whole, at all times.

I sometimes secure the loose flange 11 permanently in position upon the rim by any suitable means, such as rivets 11′ as shown in Figs. 2 and 3. Should it be desirable to change the position of the ring it can readily be loosened by cutting out the rivets. While it might be possible to use a loose ring flange in connection with a solid or uncut tire rim, I usually prefer to divide or cut the rim at least at one point in its circumference for the purpose of permitting the easy insertion of the rim within a tire or its withdrawal therefrom, and in Figs. 5 and 6 I have illustrated two different forms of rim-end connection. In Fig. 5 I have shown a rim cut apart upon a diagonal line 18′ and the rim ends connected together by means of a bridge plate 19. The rim ends, as shown in Fig. 1, are provided with inwardly projecting dowels 20 and the plate 19 has corresponding holes to receive the dowels. The rim being cut apart upon a diagonal line permits it to be easily contracted in circumference when it is desired to place a tire upon the rim, particularly a tire which has an inexpansible base. In Fig. 6 I have shown the rim as having a small, loose section 21 which is held in position by a bridge plate 22 similar to the bridge plate 19.

When this small rim section is removed the rim proper can be readily contracted for entrance into or removal from a tire. While I usually prefer to make the loose rim 11 a solid or uncut ring, I sometimes form it in such a manner that it is capable of being taken apart at one point, and in Fig. 7 I have shown a ring of this kind. It is cut apart upon a line 23, one end of the ring being provided with a key hole slot 24, and the opposite end of the ring being provided with a projection 25 adapted to fit within the key-hole slot and when placed therein locks the two ends of the ring together. When the two ends of the ring are thus locked together and the ring is in place upon the rim and is retaining a tire thereon, it cannot become unlocked and permit the escape of the ring, as the tire and the flange against which the ring is placed hold the two ends permanently locked together. When I secure the loose ring in position with the rivets 11' I place the cut in the loose ring substantially coincident with the cut or opening in the tire rim so that the contracting of the tire rim will not be interfered with.

As many modifications of my invention will readily suggest themselves to one skilled in the art, I do not limit my invention to the specific structures herein shown and described.

Having thus described my invention, I claim as new and desire to secure by Letters Patent.

1. A tire rim having two outwardly extending tire flanges of different shapes spaced at a greater distance apart than the width of the base of a tire to be mounted thereon, in combination with a loose ring mounted upon the rim between the flanges formed to coöperate alternately with each of said rim flanges to fill the space between a tire base and the rim and to retain a tire thereon.

2. A tire rim having a clencher tire flange at one side and a straight tire flange at the opposite side spaced apart on the rim a greater distance than the width of the base of a tire to be mounted thereon, in combination with a loose ring mounted on the rim between its flanges and formed to present a clencher flange opposite to the similar flange of the rim, and a straight flange opposite to the straight flange of the rim and adapted to be positioned adjacent to either of the rim flanges to coöperate with the opposite flange to retain a tire upon the rim.

3. A contractible tire rim having an integral hooked tire flange on one side and an integral straight tire flange at the other side thereof, a movable flange ring mounted on the rim between the flanges and adapted to coöperate with either of the rim flanges to provide a tire base receiving space.

4. An integrally flanged tire rim split at one point to permit the placement thereon of a tire which has a non-stretchable base, an inwardly turned hooked flange at one side and an outwardly extending straight tire flange at the other side, in combination with a circumferential ring flange mounted on the rim between the flanges and formed to present an inwardly turned hooked flange to the similar rim flange and an outwardly turned straight tire flange to the similar straight rim flange.

5. A pneumatic tire carrier adapted to interchangeably carry tires having bases of two different forms and comprising a tire rim cut apart at one point in its circumference and having a tire retaining flange of one type at one side and a tire retaining flange of a second type at the other side, a loose flange ring mounted on the rim between the flanges and movable from side to side of the rim and adapted to coöperate with either of the rim flanges to hold a tire.

6. A pneumatic tire holder adapted to interchangeably carry tires of two different types and comprising a tire rim in the form of a split ring and having a tire retaining flange of one type at one side and a tire retaining flange of another type at the other side and means carried by the rim for alternately providing a tire holding flange thereon adjacent to one or the other of said rim flanges and similar to the opposite flange.

7. A flanged pneumatic tire rim, split or cut apart at one point only of its circumference upon a diagonal line, in combination with a continuous or uncut ring mounted upon the rim and movable thereon from one side to the other and adapted to receive and to hold tires having two different forms of bases.

8. A pneumatic tire rim, having an integral outwardly projecting tire receiving and retaining flange at each side, said rim being cut apart on a diagonal line at one point only of its circumference, in combination with a continuous or non-split ring mounted upon the rim between the flanges thereon and movable from one side to the other, adapting the rim to receive and hold either a clencher type tire or a tire having straight sides at its base.

In testimony whereof, I have hereunto set my hand, this 19th day of April, 1912, in the presence of two subscribing witnesses.

ERLE K. BAKER.

Witnesses:
 FRED M. DAVIS,
 JOHN R. LEFEVRE.